(12) United States Patent
Smith et al.

(10) Patent No.: US 7,886,145 B2
(45) Date of Patent: *Feb. 8, 2011

(54) METHOD AND SYSTEM FOR INCLUDING SECURITY INFORMATION WITH A PACKET

(75) Inventors: Michael R. Smith, San Jose, CA (US); Padmanabha Nallur, Fremont, CA (US); Wilson Kok, San Jose, CA (US); Michael Fine, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 822 days.

This patent is subject to a terminal disclaimer.

(21) Appl. No.: 10/996,102

(22) Filed: Nov. 23, 2004

(65) Prior Publication Data

US 2006/0112425 A1    May 25, 2006

(51) Int. Cl.
| | |
|---|---|
| H04L 29/06 | (2006.01) |
| G06F 9/00 | (2006.01) |
| G06F 15/16 | (2006.01) |
| G06F 17/00 | (2006.01) |
| G06F 11/00 | (2006.01) |
| G06F 12/14 | (2006.01) |
| G06F 12/16 | (2006.01) |
| G08B 23/00 | (2006.01) |

(52) U.S. Cl. .................... 713/160; 726/13; 726/14; 726/15; 726/22

(58) Field of Classification Search .............. 713/160; 726/13, 14, 15, 22
See application file for complete search history.

(56) References Cited

U.S. PATENT DOCUMENTS

| 4,922,486 A | 5/1990 | Lidinsky et al. ............... 370/60 |
| 5,017,917 A | 5/1991 | Fisher et al. ............... 340/14.1 |
| 5,113,442 A | 5/1992 | Moir ........................... 713/167 |
| 5,251,205 A | 10/1993 | Callon et al. .................. 370/60 |
| 5,615,264 A | 3/1997 | Kazmierczak ............... 705/52 |
| 5,764,762 A | 6/1998 | Kazmierczak ............... 705/52 |

(Continued)

FOREIGN PATENT DOCUMENTS

EP    0 465 016 A2    6/1991

(Continued)

OTHER PUBLICATIONS

CDAT Overview http://www.cisco.com/univercd/cc/td/doc/solution/sesm/sesm_313/toolguid/ch1_overhtm Copyright © 1992-2002 Cisco Systems, Inc.*

(Continued)

*Primary Examiner*—Kambiz Zand
*Assistant Examiner*—Benjamin A Kaplan
(74) *Attorney, Agent, or Firm*—Campbell Stephenson LLP (57) ABSTRACT

A method and system for including security information with a packet is disclosed. A packet is detected as it exits a first network and enters a second network. The first network is configured to support a network security technique, and the second network is not configured to support the network security technique. Network security information associated with the network security technique is included with the packet. A network device is configured to include network security information in overhead of a packet. A method for identifying a first network device in a network is also disclosed. Identification information of the first network is communicated to a second network device.

56 Claims, 7 Drawing Sheets

U.S. PATENT DOCUMENTS

| | | | |
|---|---|---|---|
| 5,787,427 A | 7/1998 | Benantar et al. | 707/9 |
| 5,845,068 A | 12/1998 | Winiger | 395/186 |
| 5,911,143 A | 6/1999 | Deinhart et al. | 707/103 |
| 5,941,947 A | 8/1999 | Brown et al. | 709/225 |
| 5,968,177 A | 10/1999 | Batten-Carew et al. | 726/4 |
| 6,014,666 A | 1/2000 | Helland et al. | 707/9 |
| 6,023,765 A | 2/2000 | Kuhn | 713/200 |
| 6,088,659 A | 7/2000 | Kelley et al. | 702/62 |
| 6,092,191 A | 7/2000 | Shimbo et al. | 713/153 |
| 6,202,066 B1 | 3/2001 | Barkley et al. | 707/9 |
| 6,212,558 B1 | 4/2001 | Antur et al. | 709/221 |
| 6,233,618 B1 | 5/2001 | Shannon | 709/229 |
| 6,289,462 B1 | 9/2001 | McNabb et al. | 713/201 |
| 6,292,798 B1 | 9/2001 | Dockter et al. | 707/9 |
| 6,292,900 B1 | 9/2001 | Ngo et al. | 713/200 |
| 6,304,973 B1 | 10/2001 | Williams | 713/201 |
| 6,405,259 B1 | 6/2002 | Cheston et al. | 709/245 |
| 6,449,643 B1 | 9/2002 | Hyndman et al. | 709/223 |
| 6,711,172 B1 | 3/2004 | Li | 370/401 |
| 6,754,214 B1 | 6/2004 | Mahalingaiah | 370/392 |
| 6,823,462 B1 | 11/2004 | Cheng et al. | 726/15 |
| 6,973,057 B1 | 12/2005 | Forslow | 370/328 |
| 6,985,948 B2 | 1/2006 | Taguchi et al. | 709/225 |
| 7,000,120 B1 | 2/2006 | Koodli et al. | 713/201 |
| 7,032,243 B2 | 4/2006 | Leerssen et al. | 726/17 |
| 7,136,374 B1* | 11/2006 | Kompella | 370/352 |
| 7,207,062 B2* | 4/2007 | Brustoloni | 726/13 |
| 7,284,269 B2* | 10/2007 | Marquet et al. | 726/13 |
| 7,350,077 B2 | 3/2008 | Meier et al. | 713/171 |
| 7,417,950 B2 | 8/2008 | Hofmeister et al. | 370/230 |
| 7,437,755 B2 | 10/2008 | Farino et al. | 726/5 |
| 7,506,102 B2 | 3/2009 | Lev-Ran et al. | 711/118 |
| 7,530,112 B2 | 5/2009 | Smith | 726/28 |
| 2002/0026592 A1 | 2/2002 | Gavrila et al. | 713/200 |
| 2002/0035635 A1 | 3/2002 | Holden | 709/230 |
| 2002/0184521 A1 | 12/2002 | Lucovsky et al. | 713/200 |
| 2003/0051155 A1 | 3/2003 | Martin | 713/201 |
| 2003/0088786 A1 | 5/2003 | Moran et al. | 713/201 |
| 2003/0110268 A1 | 6/2003 | Kermaree et al. | 709/227 |
| 2003/0140246 A1* | 7/2003 | Kammer et al. | 713/201 |
| 2003/0145232 A1* | 7/2003 | Poletto et al. | 713/201 |
| 2003/0154400 A1 | 8/2003 | Pirttimaa et al. | 713/201 |
| 2004/0017816 A1 | 1/2004 | Ishware et al. | 370/395.53 |
| 2004/0044908 A1 | 3/2004 | Markham et al. | 713/201 |
| 2004/0064688 A1 | 4/2004 | Jacobs | 713/150 |
| 2004/0156313 A1 | 8/2004 | Hofmeister et al. | 370/229 |
| 2004/0160903 A1 | 8/2004 | Gai et al. | 370/254 |
| 2004/0181690 A1 | 9/2004 | Rothermel et al. | 713/201 |
| 2004/0202171 A1 | 10/2004 | Hama | 370/395.1 |
| 2004/0264697 A1 | 12/2004 | Gavrilescu et al. | 380/255 |
| 2004/0268123 A1 | 12/2004 | Le et al. | 713/160 |
| 2005/0055573 A1 | 3/2005 | Smith | 713/201 |
| 2005/0097357 A1* | 5/2005 | Smith | 713/201 |
| 2005/0129019 A1 | 6/2005 | Cheriton | 370/392 |
| 2005/0177717 A1* | 8/2005 | Grosse | 713/160 |
| 2005/0190758 A1 | 9/2005 | Gai et al. | 370/389 |
| 2005/0198412 A1 | 9/2005 | Pedersen et al. | 710/30 |
| 2006/0010483 A1 | 1/2006 | Buehler | 726/1 |
| 2006/0090208 A1 | 4/2006 | Smith | 726/26 |
| 2006/0106750 A1 | 5/2006 | Smith | 707/1 |
| 2006/0112425 A1 | 5/2006 | Smith et al. | 726/13 |
| 2006/0112426 A1* | 5/2006 | Smith et al. | 726/13 |
| 2006/0112431 A1 | 5/2006 | Finn et al. | 726/22 |
| 2006/0117058 A1 | 6/2006 | Smith | 1/1 |
| 2007/0094716 A1 | 4/2007 | Farino et al. | 726/5 |
| 2009/0049196 A1 | 2/2009 | Smith et al. | 709/245 |
| 2009/0097490 A1 | 4/2009 | Sanderson et al. | 370/395.53 |

FOREIGN PATENT DOCUMENTS

| | | |
|---|---|---|
| EP | 0 697 662 A1 | 2/1996 |
| EP | 0 849 680 A2 | 12/1997 |
| EP | 1 067 745 A2 | 11/1999 |
| JP | 2002 164937 | 6/2002 |
| WO | WO 2005/027464 | 3/2005 |

OTHER PUBLICATIONS

TCP/IP Illustrated vol. 1 The Protocols pp. 112-117 W.Richard Stevens Copyright © 1994 Addison Wesley Longman, Inc.*

Microsoft® Computer Dictionary, Fifth Edition Pub Date: May 1, 2002 Excerpt of terms: routable protocol—routing table.*

IEEE Standard for Information Technology-Telecommunications and Information Exchange Between Systems—Local and Metropolitan Area Networks-Common Specifications, Part 3: *Media Access Control (MAC) Bridges*, ANSI/IEEE Std. 802.1D, 1998 Edition, Dec. 10, 1998, pp. 1-355.

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Smith, Michael R., pending U.S. Patent Application entitled "Method And Apparatus For Best Effort Propagation Of Security Group Information," U.S. Appl. No. 10/989,535; filed Nov. 16, 2004, including Specification, Claims and Abstract: pp. 1-60; Drawings: Figures 1-19 on 19 sheets.

Smith, Michael R., pending U.S. Patent Application entitled "Method and System For Generating User Group Identifiers," U.S. Appl. No. 10/970,532; filed Oct. 21, 2004, including Specification, Claims and Abstract: pp. 1-44; Drawings: Figures 1A-13C on 14 sheets.

Finn, Norman and Smith, Michael R., pending U.S. Patent Application entitled "Method and System for Including Network Security Information in a Frame," U.S. Appl. No. 10/996,101; filed Nov. 23, 2004, including Specification, Claims and Abstract: pp. 1-30; Drawings: Figures 1-6 on 6 sheets.

Wang, Ning and Pavlou, George, Scalable sender access control for bi-directional multicast routing, Computer Networks, Elsevier Science Publishers B.V., vol. 43, No. 5, Dec. 5, 2003, pp. 539-555.

Valenzi, Kathleen D., Digital Signatures: An Important "Sign" of the Future of E-Government, virginia.edu, vol. IV, No. 2, Fall 2000, Copyright 2000 The Rector and Board of Visitors of the University of Virginia, 6 pages.

Pfleeger et al., Security in Computing, 2003, Prentice Hall, 3$^{rd}$ Ed., pp. 194-207.

Islam, An Access Control Method with Subject-Object Key and Time Stamp, Jun. 2003, Malaysian Journal of Computer Science, vol. 16, No. 1, pp. 77-83.

Barkley et al., Supporting Relationships in Access Control Using Role Based Access Control, Jul. 1999.

* cited by examiner

METHOD AND SYSTEM FOR INCLUDING SECURITY INFORMATION WITH A PACKET

BACKGROUND OF THE INVENTION

1. Field of the Invention

This invention relates to the field of providing security within a network, and more particularly relates to a method and system for supporting security within a network by including information related to the security of a network within a packet.

2. Description of the Related Art

The rapid increase in the size and complexity of networks continually creates new security challenges. Furthermore, the advent of new technologies can result in new security vulnerabilities, while the number of security threats that can potentially exploit these vulnerabilities is constantly increasing. This is true of all manner of networks, including enterprise networks, service provider networks, and the like. Thus, the need for securing networks is increasing, and at the same time, providing security for networks is becoming more and more difficult.

In an effort to keep up with the increasing need for security within networks, network administrators typically upgrade network software and hardware on a regular basis. Upgrading an entire network can be expensive and time consuming; therefore, administrators often update networks by upgrading one region of the network at a time. Upgrading a network one region at a time can create new security challenges. Such an approach leaves portions of the network unprotected from security threats, which can result in compromising the security of the entire network.

Network administrators also face additional challenges when transferring data across a network that does not support a procedure for providing security within the network. For example, many enterprise networks connect to remote networks by using the Internet as a transporting network. In this configuration, virtual private networks are often implemented to provide network security. Virtual private networks typically use tunneling to create a private network across the Internet. Tunneling is the process of encapsulating a packet with a header that is understood by the transporting network and the tunnel endpoints. In other words, the packet's original header is encapsulated by a header that is added by the tunneling protocol, and the transporting network sees only the new header. Tunneling can be used to transport a packet that uses a protocol not supported on a network to send the packet over such a network.

Unfortunately, implementing tunneling in a network also has its disadvantages. For example, networks that implement tunneling are difficult to manage and tend to lack scalability. These challenge are due, at least in part, to the point-to-point nature of tunneling and the configuration overhead associated with implementing the tunnel. Each tunnel head and end needs to know all the tunnel destination points. Furthermore, to be effective, a network that implements tunneling typically needs a mesh of tunnels. Thus, to implement tunneling in a network, routing in the network needs to be re-worked in order to forward traffic down the tunnels appropriately.

What is needed, then, is a scalable solution for maintaining the security of a network across a portion of a network that does not support a procedure for providing security within the network. The approach should be able to provide security within a network in a manner that does not require the point-to-point transmission of information. Preferably, such an approach could be implemented in a portion of the network at a time. The approach should be implemented without incurring a disproportionate administrative burden or consuming inordinately large amounts of network resources, while at the same time the approach should be able to work with existing and future network protocols.

BRIEF DESCRIPTION OF THE DRAWINGS

The present invention may be better understood, and numerous objects, features, and advantages made apparent to those skilled in the art by referencing the accompanying drawings.

DETAILED DESCRIPTION OF THE INVENTION

The following is intended to provide a detailed description of an example of the invention and should not be taken to be limiting of the invention itself. Rather, any number of variations may fall within the scope of the invention, which is defined in the claims following the description.

Introduction

The present invention addresses the limitations outlined above by providing a method and system that includes security information within the overhead of a packet in order to provide security in a network. In one embodiment of the present invention, a first secure network (i.e., a network that supports a network security technique) sends a packet to a second secure network via an unsecure network (i.e., a network that does not support the network security technique of the secure network.) Before exiting the first secure network, security information can be included in overhead of the packet. Two different types of security information can be included in the packet overhead: information related to the security of the network (network security information), and information related to the security of the packet (packet security information). The procedure for including network security information with a packet differs in some regards from the procedure for including packet security information with a packet; therefore, the procedures are introduced separately.

Network security information is used to implement a network security technique of a secure network. According to an embodiment of the present invention, network security information is included with a packet when a secure network transfers a packet to another secure network via an unsecured network. The transfer of user data from one network node to another network node is facilitated by the use of a communications model, such as the open systems interconnect (OSI)

model, for example. While the examples presented herein are discussed in terms of the OSI model, it will be noted that the present invention can be implemented in other communication models and routable protocols, such as internet packet exchange (IPX), systems network architecture (SNA), Apple-Talk™, and other such communication models and protocols.

The OSI model sets forth a seven-layer protocol stack and describes how control of user data is passed from one protocol layer to the next. As the user data passes through certain protocol layers, the user data is encapsulated with a header that is specific to the protocol layer. The information (which includes encapsulation headers and other routing information) added to the packet during the transmission process is referred to herein as packet overhead. In other words, packet overhead is any information in a packet other that the revenue-generating user data.

According to an embodiment of the present invention, network security information is included in a packet such that the network security information is not available to network devices within an unsecure network while being accessible to network devices on a perimeter of a secure network. Furthermore, the network security information is included in the packet such that the network security information is transparent to routing devices of the network. As discussed herein, network security information in a packet's overhead is transparent to a network device if the presence of the security information does not affect the packet forwarding or processing performed by the device. For example, if the unsecure network is a layer-2 network (of the OSI model) and perimeter devices of the secure network are layer-3 routers, security information can be included in a layer-3 header of the packet. The layer-3 routers can access and process the network security information, and layer-2 switches of the unsecure network can forward the packet as though the network security information were not present in the packet.

As a packet travels from the secure network to the unsecure network, a perimeter device (e.g., a layer-3 router) on the perimeter of the secure network detects that the packet is entering an unsecure network. The layer-3 router also determines whether the packet, after traversing the unsecure network, will be routed through another router capable of processing the network security information. In one embodiment, this determination can be made by determining if all the devices on the perimeter of a destination network of the packet are capable of processing the network security information. The layer-3 router includes network security information with the packet if the packet will be sent through another router capable of processing the network security information.

As previously mentioned, packet security information, instead of network security information, can be included with a packet that is exiting a secure network and entering an unsecure network. Before exiting the secure network, a perimeter device of the secure network makes a determination as to whether the packet will eventually be processed by another device capable of parsing the packet security information. In one embodiment, the perimeter device of the secure network encrypts the packet and includes packet security information, such as encryption information, in the overhead of the packet.

Key advantages of the present invention include providing a scalable solution for propagating security information across an unsecure network. The present invention does not require modification of a network's routing topology, and the principles of the present invention can be implemented to leverage existing management and policy infrastructure for storing and distributing the security information. Thus, a network administrator can incrementally upgrade selective areas of the network, while continuing to support network security throughout the network.

Including Security Information with the Packet

Figure 1:
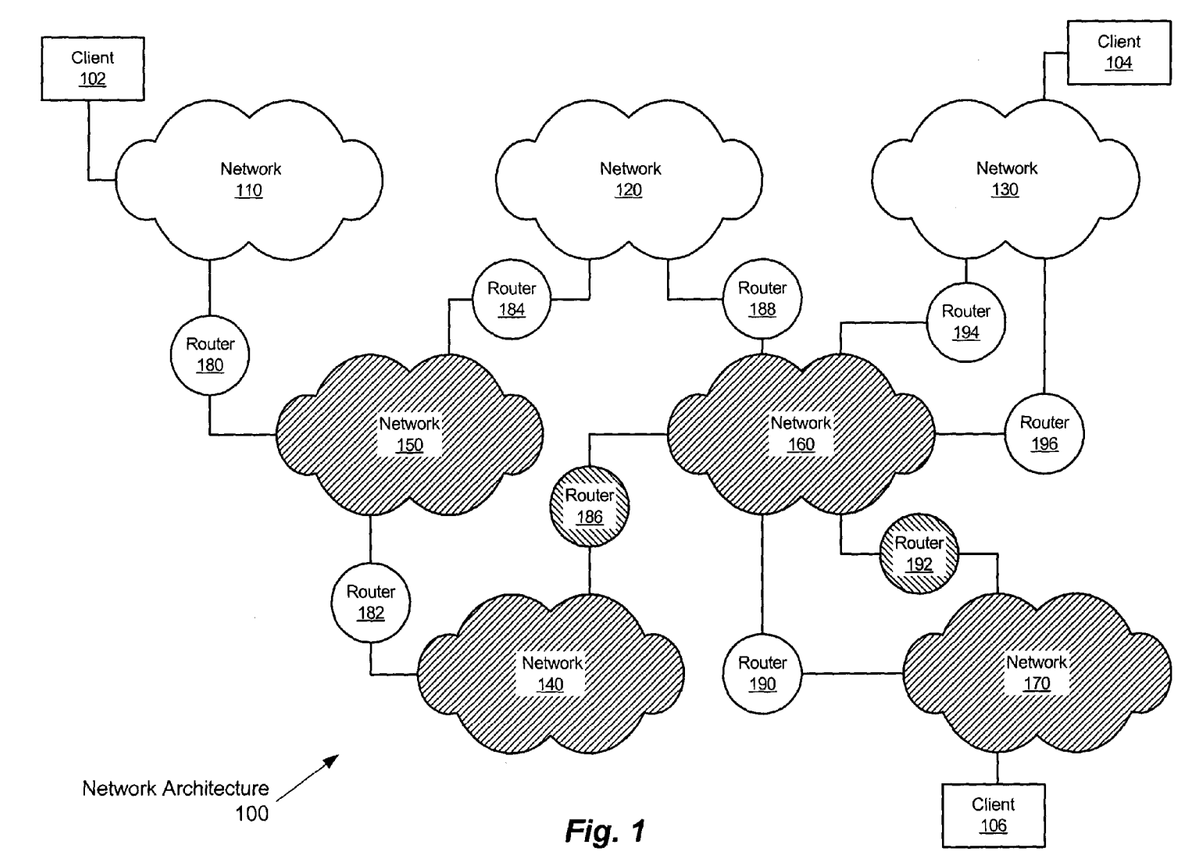
FIG. 1 is a diagram illustrating a network architecture according to embodiments of the present invention.

FIG. 1 is a diagram illustrating a network architecture 100 according to embodiments of the present invention. Network architecture 100 includes a network 110, a network 120, and a network 130, which are secure networks. Network architecture 100 also includes a network 140, a network 150, a network 160, and a network 170, which are unsecure networks. It is noted that the term 'network' is used herein to refer to a data communication system that transmits data from one network node to another network node. Such a network can be an enterprise network, a service provider network, or the like. Furthermore, the network can include a single node or multiple nodes. The network can also be a local area network (LAN), a wide area network (WAN), a metropolitan area network (MAN), or regions within such networks (e.g., sub-networks).

As shown in FIG. 1, a client 102 is connected to network 110. To transmit a packet from client 102 to client 104 or client 106, the packet is first routed through network 110. As previously mentioned, network 110 is a secure network. A secure network provides network security by implementing one or more of a variety of network security techniques. For example, a secure network can provide intrusion protection, secure connectivity, perimeter security, identity services, access control, security management services, or other such network security techniques.

Routers that are capable of adding and removing security information from the overhead a packet are referred to herein as security-information-processing (SIP) routers. Routers that are not capable of adding and removing security information form the overhead of a packet are referred to herein as non-SIP routers. Network architecture 100 includes a router 180, a router 182, a router 184, a router 188, a router 190, a router 194, and a router 196, all of which are SIP routers. Other routers in network architecture are a router 186 and a router 192, which are non-SIP routers.

After traversing network 110, the packet is processed by router 180. Router 180 makes a two-fold analysis to determine whether to insert security information into a header of the packet. The analysis includes determining (1) whether the packet is entering an unsecure network, and (2) whether the packet will be processed by an SIP router after traversing the unsecure network. If the packet is entering an unsecure network and will be processed by an SIP router after exiting the unsecure network, router 180 can include security information with the packet. The packet is being routed through network 150, an unsecure network, and will be processed by either router 184 or router 186, which are both SIP routers; therefore, router 180 inserts security information into the overhead of the packet. The security information is inserted in a location within the packet overhead that makes the security information transparent to non-SIP routers, inaccessible to devices within unsecure networks, and accessible to SIP routers. For an example of the manner in which security information can be included with a packet, see patent application Ser. No. 10/996,101, filed Nov. 23, 2004, entitled "METHOD AND SYSTEM FOR INCLUDING NETWORK SECURITY INFORMATION WITH A FRAME," having Norman W. Finn and Michael R. Smith as inventors, which is hereby incorporated by reference, in its entirety and for all purposes.

As previously mentioned, the security information can either be packet security information or network security information. Network security information can be a user group identifier (e.g., a security group tag), or other information related to the security of a network. Packet security information can include an encryption group tag, integrity check information, or other information related to the security of the packet. In one embodiment, router 180 encrypts the packet and includes encryption information in overhead of the packet.

The packet traverses network 150 and arrives at router 184, for example. Router 184 detects that the packet is exiting an unsecure network (network 150) and entering a secure network (network 120). When a packet (with network security information in packet overhead) exits an unsecure network and enters a secure network, the network security information can be moved to a new location in the packet overhead. Thus, router 184 moves the network security information to a new location in the packet overhead to make the security information accessible to the network devices within secure networks. In an alternative embodiment, router 184 can completely remove the security information from the packet. If the packet had been encrypted by router 180, router 184 could use the encryption information to decrypt the packet.

The packet traverses network 120 and is received by router 188. In one example, the packet is addressed to client 106 and will traverse network 160, an unsecure network, en route to client 106. Router 188 will remove security information from a packet if the packet is entering an unsecure network and the packet will not be processed by an SIP router after exiting the unsecure network. Router 190, an SIP router, and router 192, a non-SIP router, are the routers on the perimeter of network 170. The packet could be processed by either of router 190 or router 192 before entering network 170; therefore, router 188 removes the security information from the packet because of the possibility that the packet will be processed by a non-SIP router. Finally, the packet traverses network 160, and after being processed by either router 190 or router 192, the packet traverses network 170 and arrives at client 106.

In another example, the packet is addressed to client 104. Router 188 detects that the packet will be processed by either router 194 or router 196 after traversing network 160; therefore, router 188 moves the security information to a location within the packet that is not accessible to devices within network 160 and is accessible to router 194 and router 196. After traversing network 160, the packet is processed by either router 194 or router 196. Because the packet is entering a secure network (network 130), the router that processes the packet can move the network security information to a location that is accessible to devices within network 130. Finally, the packet travels through network 130 and arrives at client 104.

In yet another example, the packet egresses network 150 through router 182. If the packet is addressed to client 106, router 182 determines that the packet will not necessarily be processed by another SIP router. This is because the packet will be processed by router 186, and after leaving network 160, the packet might be processed by router 192. Both router 186 and router 192 are non-SIP routers, and as such are not able to process the security information. However, if the packet is addressed to client 104, router 102 determines that the packet will be processed by another SIP router. This determination can be made by recognizing that the perimeter of network 130 (the network of client 104) is completely secured by SIP routers. It is noted that the packet will pass through a non-SIP router, router 186, before entering network 160. As previously mentioned, the security information is included in the packet such that the security information is transparent to non-SIP routers. Thus, router 186 can forward the packet, even though router 186 cannot understand or process the security information.

Role Based Access Control

According to an embodiment of the present invention, the network security technique is role based access control. For an example of how role based access control is used to enforce network security, see patent application Ser. No. 10/659,614, filed Sep. 10, 2003, entitled "METHOD AND APPARATUS FOR PROVIDING NETWORK SECURITY USING ROLE-BASED ACCESS CONTROL," having Michael R. Smith as inventor, which is hereby incorporated by reference, in its entirety and for all purposes. In the example of role based access control, the security information to be included with a packet is a user group identifier (UGI). The security group to which the source of a packet belongs is classified at the ingress of a network. The group membership is carried in a UGI in the packet from a classification point to a policy enforcement point at the network egress. A packet that includes a UGI in a header of the packet is referred to herein as a UGI-tagged packet. In an embodiment of the present invention, the UGI is a security group tag.

Figure 2:
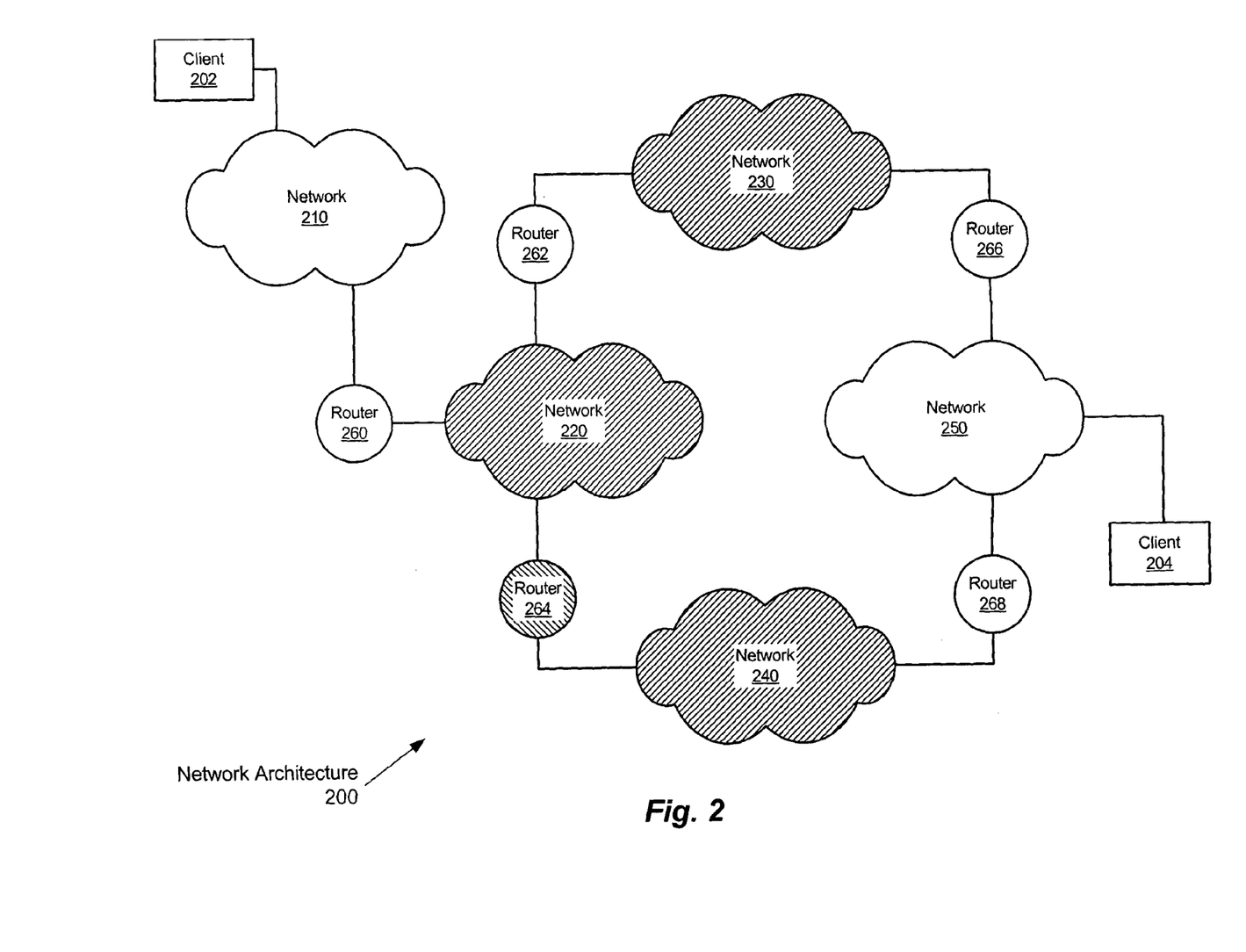
FIG. 2 is a diagram illustrating a network architecture according to embodiments of the present invention.

FIG. 2 is a diagram illustrating a network architecture 200 according to embodiments of the present invention. The following is an example of how the principles of the present invention can be implemented to transport a UGI through a network that is unsecure with respect to role based access control. In this example, a network 210, and a network 250 are layer-2 networks with layer-2 devices capable of forwarding UGI-tagged packets (i.e., secure layer-2 networks). A network 220, a network 230, and a network 240 are layer 2 networks with layer-2 devices that are not configured to forward UGI-tagged packets (i.e., unsecure layer-2 networks). Network architecture also includes a router 260, a router 262, a router 266 and a router 268, which are layer-3 routers that are capable of adding and removing UGIs to and from a layer-3 header of a packet. Also included is a router 264, which is not capable of adding or removing a UGI from the layer-3 overhead.

Client 202 includes a UGI in a layer-2 header of the packet before transmitting the packet to network 210. The UGI, which is associated with the security user group of client 202, is typically obtained during an authentication process. The authentication process can be initiated, for example, when a user attempts to log into client 102. The user (not shown) causes client 202 to act as a supplicant to send a start message to an authenticator. The authenticator responds to client 202 with a request/identify message, to which client 202 responds with a response/identity message. The authenticator passes this information to an authentication server. A variety of exchanges subsequently occur between the authenticator and the authentication server, and during the exchanges the authenticator can obtain a UGI associated with client 202 from the authentication server. This authentication process also allows for the dissemination of network security information to various other network devices. User group identifiers can be downloaded to the routers in network architecture 200, or to other network devices within the networks.

For a more thorough discussion of how a user group identifier can be generated and obtained, see patent application Ser. No. 10/970,532, filed Oct. 21, 2004, entitled "METHOD AND SYSTEM FOR GENERATING USER GROUP IDENTIFIERS," having Michael R. Smith as inventor, which is hereby incorporated by reference, in its entirety and for all purposes.

As previously mentioned, client 202 obtains a UGI, includes the UGI with the packet, and transmits the packet to network 210. After traversing network 210, the packet is processed by router 260. In one embodiment, router 260 provides role based access control and can use the UGI to determine whether the packet should be forwarded or dropped. The router can determine whether to forward or drop the packet by using the UGI and a UGI permissions list stored on the router. If the UGI permissions list indicates that the packet is allowed to be forwarded to its destination, router 180 removes the UGI from the packet and forwards the packet. If the permissions list indicates that the packet is not allowed to be forwarded to its destination (i.e., is to be denied), the packet is dropped.

According to an embodiment of the present invention, router 260 determines whether the destination client, client 204, is connected to a network whose perimeter devices are capable of adding and removing UGIs from a packet. Client 104 is connected to network 250. The perimeter devices of network 250 are router 266 and router 268, which are both routers capable of adding and removing UGIs from packets. Therefore, router 260 moves the UGI from a layer-2 header and includes the UGI with the packet in a layer-3 header, for example.

After being processed by router 260, the packet traverses network 220 and arrives at either router 264 or router 262. If the packet is processed by router 262, the packet traverses network 230 and arrives at router 266. If the packet is processed by router 264, the packet traverses network 240 and arrives at router 268. Either of router 226 and router 268, after receiving the packet, can move the UGI from the layer-3 header to a layer-2 header of the packet. The packet is subsequently forwarded through network 150 and received at client 104. It is noted that the packet can be sent through router 264, which is able to process the packet because the UGI is transparent to router 264. When the packet is processed by router 262, router 262 can perform role based access control on the packet. Router 262 can also forward the packet without processing the UGI information. In another embodiment, router 266 and router 268 are security policy enforcement points capable of performing role based access control.

While packets are used herein as an example of a data communication mechanism, the principles of the present invention are not limited to packets. The present invention can also be applied to frames or other units of data transfer that are used to carry information from one network node to another network node. Furthermore the present invention can be applied within layers of the OSI model other than the second and third layers.

It will be appreciated that the present invention allows a network to be upgraded over time to support role based access control. Without the present invention, the layer-2 devices within unsecure networks cannot process a packet that includes a UGI; therefore, the UGI needs to be dropped before the packet enters the unsecure network and implementation of the network security policy is thus weakened. The UGI can be carried in the packet hop-by-hop across an unsecure network, but this approach requires that the links along the path are updated to understand and process the UGI. Tunneling can also be implemented, but also requires an upgrade in hardware and a change in routing topology.

As will be appreciated in the examples presented herein, the present invention overcomes the disadvantages of other solutions. The present invention does not require a change in routing topology and does not have the point-to-point characteristic of tunneling. For example, the embodiments presented with respect to FIG. 2 show how a packet can traverse two different paths en route to a destination. Also, it is likely that a customer will gradually upgrade network hardware and software over time instead of upgrading the entire network all at once. The present invention provides for the preservation of a UGI in a packet that traverses a partially upgraded network by including the UGI in a layer-3 header of the packet. These partially upgraded areas within a network can be data centers, individual buildings, individual sites, or other networks or portions of a network.

Security Information Management

Figure 3:
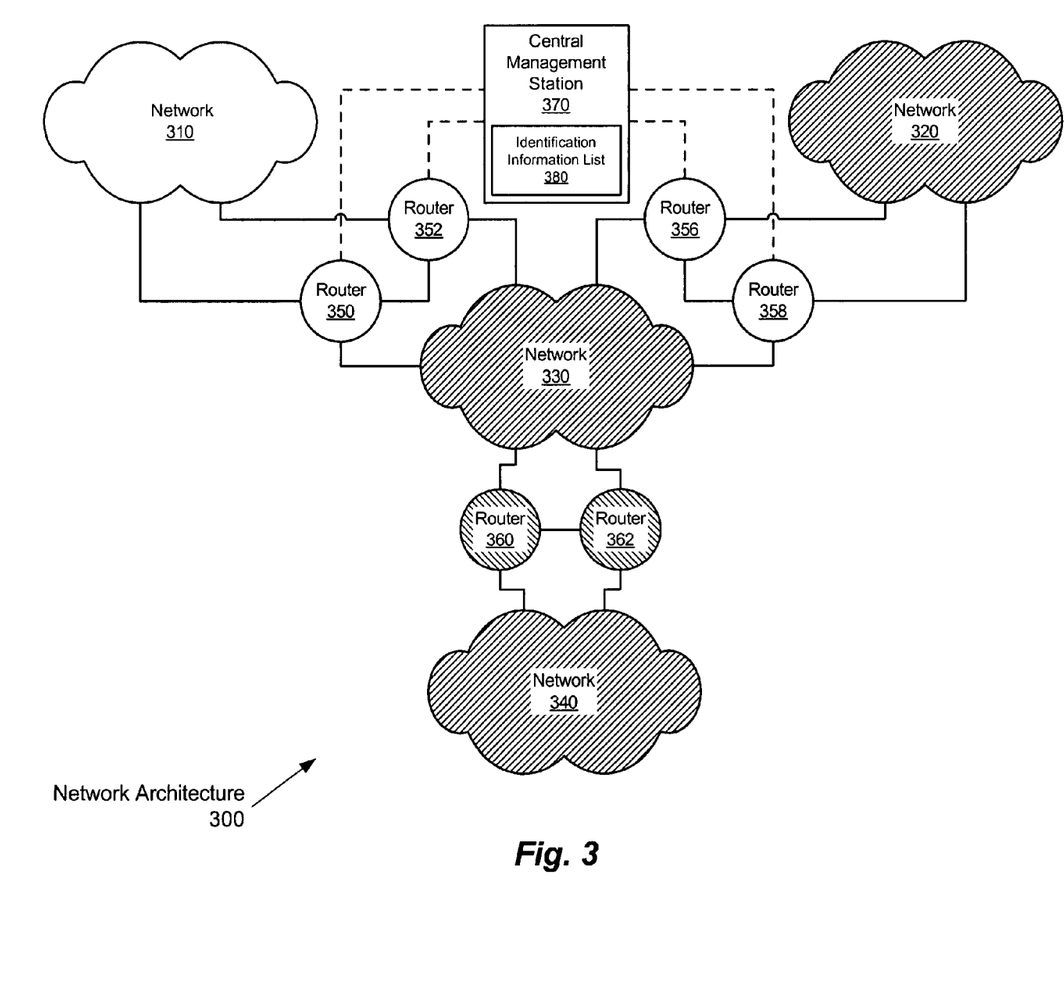
FIG. 3 is a diagram illustrating a network architecture according to embodiments of the present invention.

FIG. 3 is a diagram illustrating a network architecture 300 according to embodiments of the present invention. Network architecture includes two routers, a router 360 and a router 362, that are not capable of adding or removing security information. The security information can be included in a packed as a 'shim.' In the present disclosure, shim refers to the extra security information that is inserted into a packet. In one embodiment, a router 350 and a router 352 are shimmers (routers capable of inserting security information into a packet as a shim). Network architecture 300 also includes a router 356 and 358, which are de-shimmers, or routers that are capable of removing a shim from a packet. Network architecture 300 includes one secure network, a network 310. Network architecture 300 also includes a network 320, a network 330, and a network 340, which are unsecure networks. Network 320 is different from the other networks because all of the perimeter devices of network 320 are de-shimmers; therefore, a packet that includes a shim (shimmed packet) can be sent to network 320. When all of the perimeter devices of a network are de-shimmers, the network is referred to herein as a shim-qualified network.

Network architecture 300 also includes an identification information list 380 within a management station 370. The identification information list 380 contains information that identifies devices within shim-qualified networks. In FIG. 3, the only shim-qualified network is network 320. Therefore, identification information list 380 only identifies devices in network 320. The identification information can be prefixes, network addresses, or other information that identifies a network or a network device. In an alternative embodiment, the identification information list contains identification information for network nodes or portions of a network that are not capable of encrypting a packet or processing security information.

As a packet travels from network 310 to network 320, the packet will first be processed by router 350 or router 352. The router that processes the packet determines whether to include security information with the packet. To make this determination, the router compares information from identification information list 380 to information within overhead of the packet, such as a destination address of the packet. The packet is addressed to a device within network 320, a shim-qualified network; therefore, a security shim is included with the packet.

A security administrator can generate identification information list 380. The security administrator manually configures identification information list 380 with prefixes and device addresses that are within network 320. The shimmers, router 350 and router 352, download the identification information list from the management station. In an alternative embodiment, interfaces of the shimmers in the shim-qualified network are marked as shimmable, and routes learned through these interfaces are considered shimmable routes. De-shimmers automatically update identification information list 380 with the prefixes that designate the shim-qualified network. The shimmers then automatically download identification information list 380 from management station 370.

It is noted that the foregoing approaches to creating, maintain, and distributing identification information list 380 provide the advantage of using only management station 370, the shimmers, and the de-shimmers to manage the identification information list 380. Another advantage of the foregoing embodiments is that the identification information list only needs to be updated when there is a network design change, but not when there is only a temporary topology change in the network. Furthermore, an existing management policy can be modified and used to implement the foregoing principles in a network.

According to another embodiment, an existing routing protocol can be used to communicate identification information of shim-qualified networks to the shimmers. Device interfaces of devices within the shim-qualified networks are marked as shimable. The network prefixes of the shim-qualified network are learned from routing through the device interfaces. Thus, when a de-shimmer advertises routes (for prefixes within the shim-qualified network), the de-shimmer can designate a route as a shimmable route. When a shimmer sends a packet over a route that is designated as a shimmable route, the shimmer includes a shim with the packet. In one embodiment, the routing protocol is the Open Shortest Path First (OSPF) protocol and the prefixes are distributed using link state advertisements (LSAs).

In another embodiment, a new distribution protocol can be used to communicate identification information of shim-qualified networks to the shimmers. As mentioned in the previous embodiment, the prefixes within the shim-qualified network learned from routing are propagated to shimmers within the network. In one embodiment, the new distribution protocol uses one bit to indicate that an interface is shimmable.

After obtaining identification information of shim qualified networks, the identification information is made accessible to shimmers and other network devices. In one embodiment, the identification information is included in an access control list. A shimmer can compare a destination address (or portion of a destination address) of a packet to the identification information in the access control list to determine whether the packet will routed through a shim-qualified network.

Instead of including the identification information in an access control list, the identification information can be included in a forwarding table. The forwarding table can then be used by shimmer's to determine whether a packet will be routed through a shim-qualified network. It is noted that the present invention is well suited to leverage central policy servers or management stations to store and distribute the shim-qualified prefixes or addresses to all the shimmers and de-shimmers in the network.

In one embodiment, de-shimmers can provide additional security by verifying that all packets coming from shimmers include shims within the packet overhead. The de-shimmer can obtain source addresses of devices located within a network bordered by shimmers. The de-shimmer can check whether a packet comes from such a network, and if so, the packet should have a shim. If the packet does not include a shim, the packet can be dropped; or, if the security information in the shim is a UGI, the packet can be given a default UGI. Furthermore, a packet that arrives without a shim can be given a UGI if the packet came from a network that was not capable of adding shims.

Network architecture 300 also illustrates that the present invention can be implemented by upgrading one network at a time. Network 340 is an unsecure, non-shim qualified network (i.e., a network that has not been upgraded to support the network security technique of the secure network). A network administrator can first upgrade the perimeter of a network with shimmers, while leaving the network itself as an unsecure network. An example of a network in this stage of the upgrade process is network 320. Then, the network can be updated to be a secure network; in other words, the devices within the network can be upgraded to be able to process shimmed packets. An example of such a network is network 310. Finally, the core network, such as network 330, can be upgraded with hardware and software that support processing shimmed packets. Since there is no single well-defined shim termination point for a shimmed packet, a network administrator should be careful to ensure that shimmed packets are not able to leave the network without having the shim removed. Thus, the present invention provides a scalable solution for carrying security information across an unsecure network.

In an alternative embodiment, the entire network perimeter is upgraded with shimmers. This solution eliminates the need to ensure that a shimmed packet will be processed by a de-shimmer before arriving at its destination. However, this approach does not give the network administrator the flexibility of gradually updating the network over time.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiments are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4A:
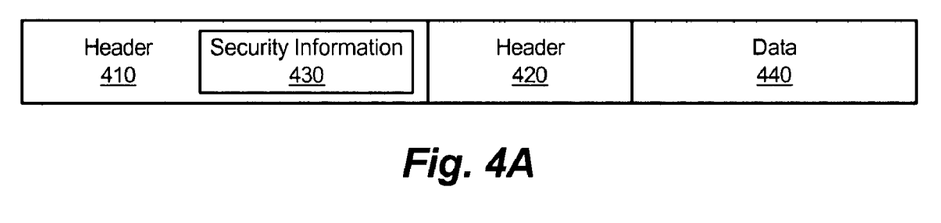
FIG. 4A is a diagram illustrating security information within a header of the packet according to embodiments of the present invention.

FIG. 4A is a diagram illustrating security information within a header of the packet according to embodiments of the present invention. The packet includes a header 410, which includes security information 430. Header 410 is followed by a header 420 and by a data field 440. In one embodiment, header 410 is a layer-2 header and header 420 is a layer-3 header. The security information can be included in the layer-2 header after the link/type field of the frame. The link/type field value can indicate the presence of security information in the frame. Thus, if a network device understands the link/type field value, the network device will be able to parse the frame.

The present invention also includes numerous other embodiments for including security information in a layer-2 header. For example, the security information can be included in the header of the frame, and a header length field can then be used to indicate the presence of the security information in the header. In other embodiments, the security information can be included in a multi-protocol label switching (MPLS) header, an 802.1q tag, a security header, or other portion of a frame. As with the link/type field example, in any embodiment of the present invention the security information is included in the frame in a manner that allows another device in the network to parse the frame.

Figure 4B:
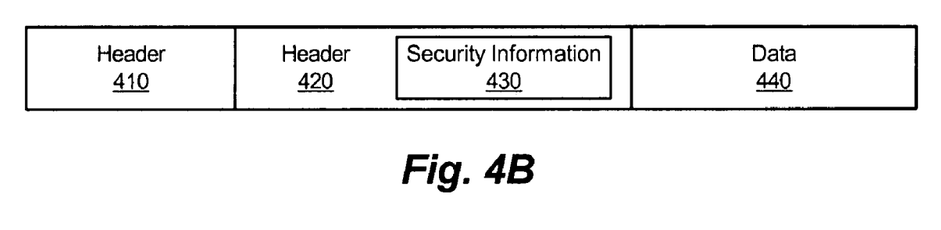
FIG. 4B is a diagram illustrating a packet with security information according to embodiments of the present invention.

FIG. 4B is a diagram illustrating a packet with security information according to embodiments of the present invention. When security information is moved from a first header to a second location in packet overhead, the second location can be another header, such as header 420. While security information 430 is shown in FIG. 4B to be included at an end of header 420, security information 430 can also be included after header 420 and before data 440. Security information can also be moved from header 420 back to header 410.

Figure 5:
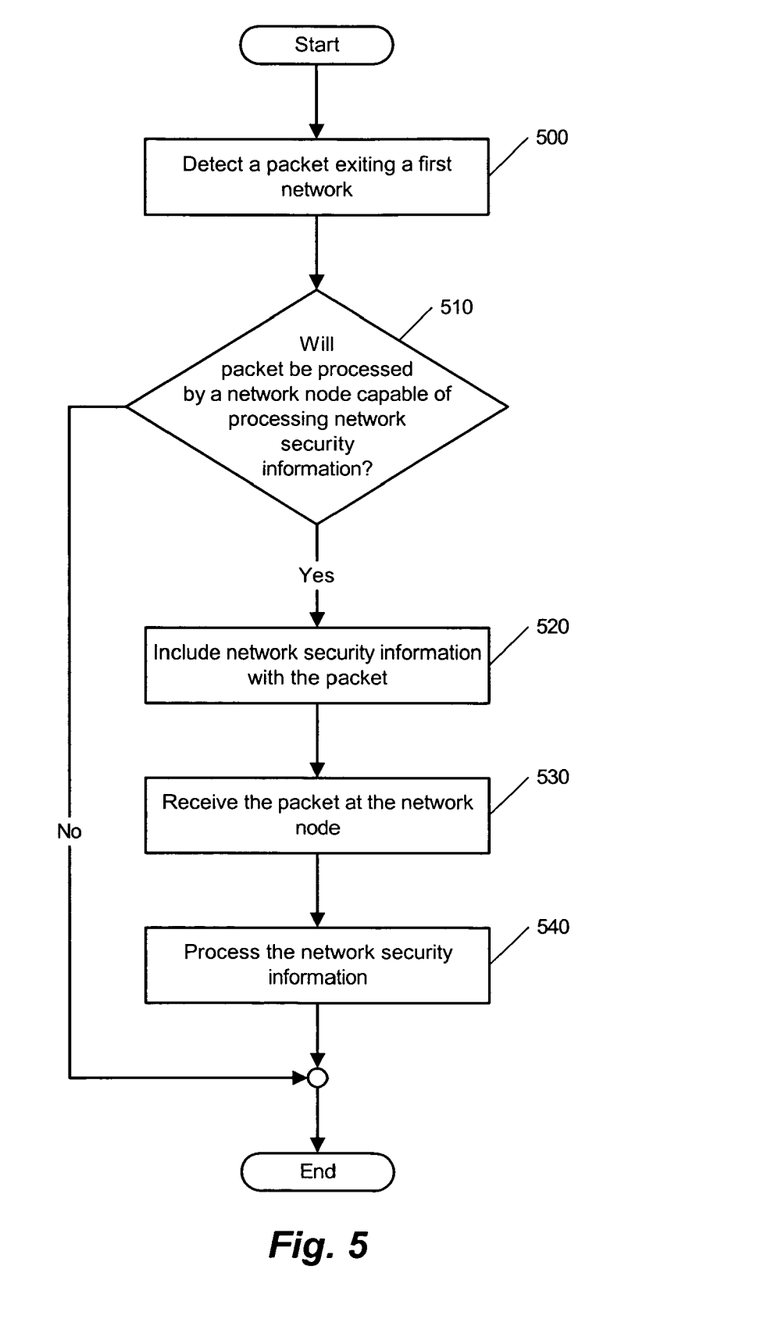
FIG. 5 is a flow diagram illustrating an example of handling network security information according to embodiments of the present invention.

FIG. 5 is a flow diagram illustrating an example of handling network security information according to embodiments of the present invention. First, a network device detects a packet exiting a first network (step 500). This detection can occur when the network device receives the packet. At this point, the network device can determine whether the first network was a secure network. The network device then determines whether the packet, before arriving at a destination, will be processed by another network node capable of processing network security information (step 510). As previously described, the determination can be made using identification information. If the network device determines that the packet will be routed through another network node capable of processing the network security information, the network device includes network security information with the packet (step 520). Then, the packet is received at the network node (step 530), and the network node processes the network security information (step 540).

Figure 6:
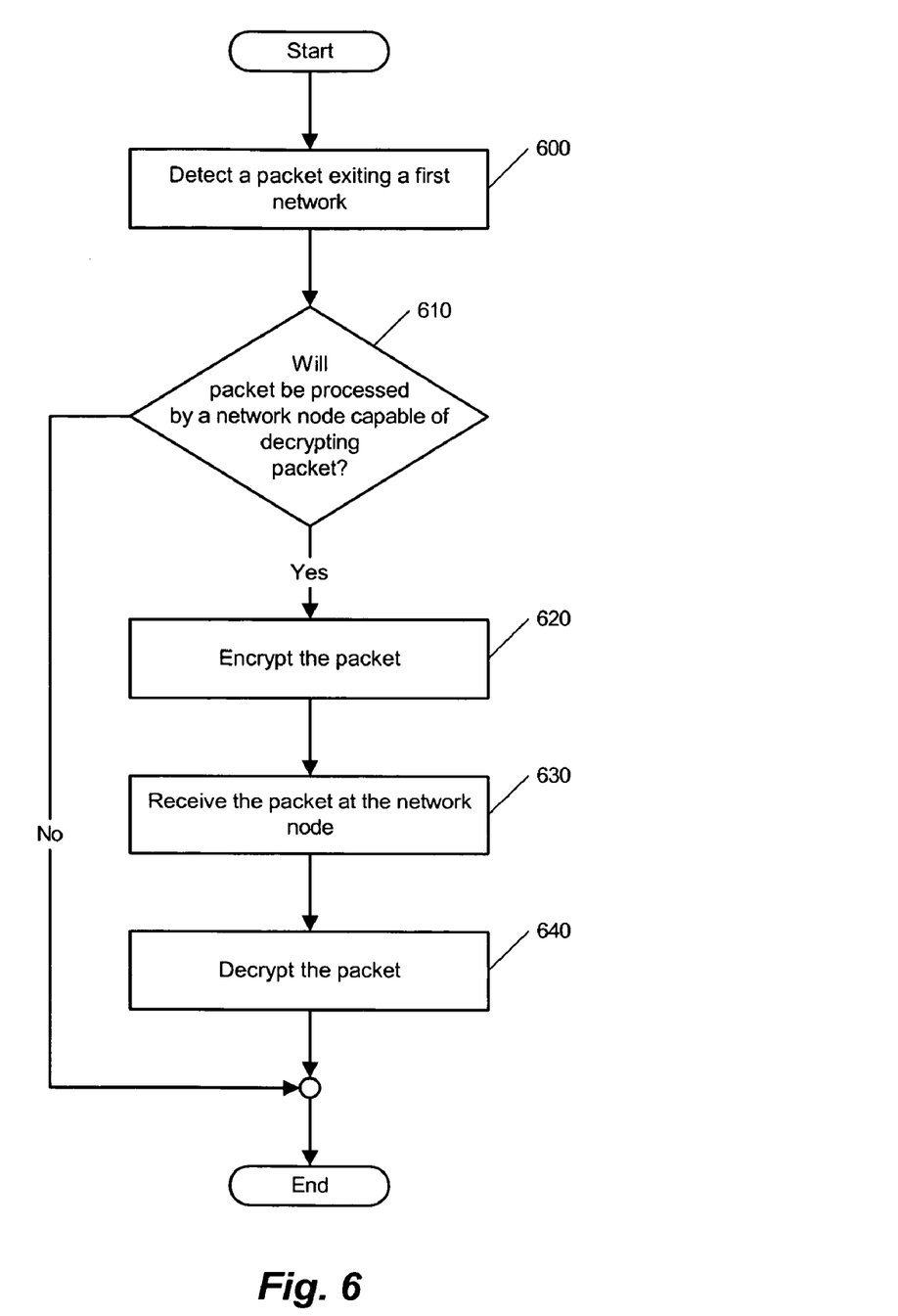
FIG. 6 is a block diagram illustrating a network device according to embodiments of the present invention.

FIG. 6 is a flow diagram illustrating an example of encrypting a packet according to embodiments of the present invention. First, a network device detects a packet exiting a first network (step 600). The network device determines whether the packet, before arriving at a destination, will be processed by a network node capable of decrypting the packet. (Step 610). If the network device determines that the packet will be processed by a network node capable of decrypting the packet, the network device encrypts the packet and includes encryption information in overhead of the packet (step 620). In one embodiment, network devices capable of encrypting and decrypting packets share a group security association such that a packet encrypted with the group key can be decrypted by any decrypting device. The packet is received at the network node (step 630), and the network node can decrypt the packet (step 640). As will be appreciated, other methods of securing the packet can be employed in a process according to the present invention, such as that described in connection with FIG. 6, including digital signatures and the like.

Figure 7:
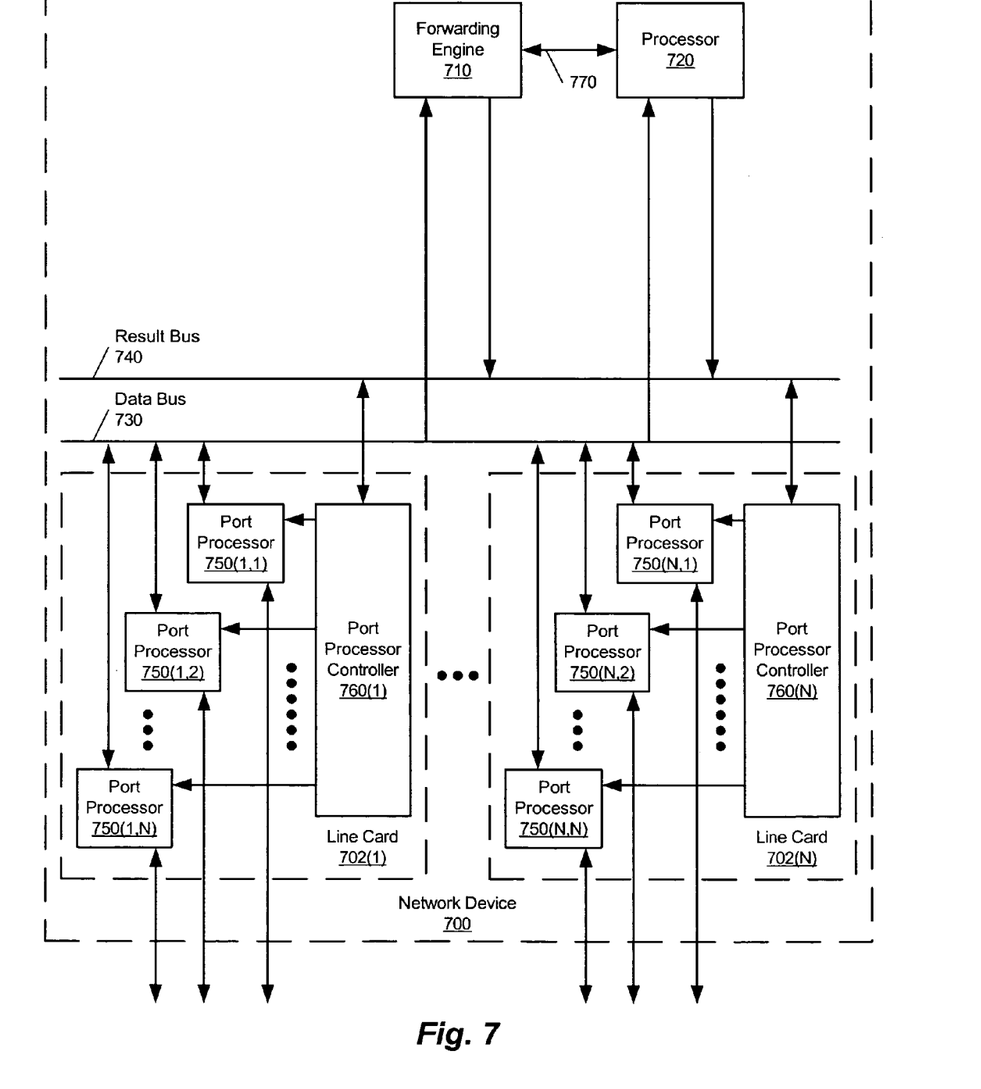
FIG. 7 is a flow diagram illustrating an example of encrypting a packet according to embodiments of the present invention.

FIG. 7 is a block diagram illustrating a network device. In this depiction, network device 700 includes a number of line cards (line cards 702(1)-(N)) that are communicatively coupled to a forwarding engine 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

When a packet is received, the packet is identified and analyzed by a network device such as network device 700 in the following manner, according to embodiments of the present invention. Upon receipt, a packet (or some or all of its control information) is sent from the one of port processors 750(1,1)-(N,N) at which the packet was received to one or more of those devices coupled to data bus 730 (e.g., others of port processors 750(1,1)-(N,N), forwarding engine 710 and/or processor 720). Handling of the packet can be determined, for example, by forwarding engine 710. For example, forwarding engine 710 may determine that the packet should be forwarded to one or more of port processors 750(1,1)-(N,N).

This can be accomplished by indicating to corresponding one(s) of port processor controllers 760(1)-(N) that the copy of the packet held in the given one(s) of port processors 750(1,1)-(N,N) should be forwarded to the appropriate one of port processors 750(1,1)-(N,N).

In the foregoing process, network security information can be included in a frame sourced by network device 700 in a number of ways. For example, forwarding engine 710 can be used to detect the need for the inclusion of network security information in the packet, and processor 720 can be called into service to provide the requisite network security information. This network security information can be included in the packet during the transfer of the packet's contents from one of port processors 750(1,1)-(N,N) to another of port processors 750(1,1)-(N,N), by processor 720 providing the requisite information directly, or via forwarding engine 710, for example. The assembled packet at the receiving one of port processors 750(1,1)-(N,N) can thus be made to contain the requisite network security information.

In addition, or alternatively, once a packet has been identified for processing according to the present invention, forwarding engine 710, processor 720 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Moreover, while the invention has been particularly shown and described with reference to these specific embodiments, it will be understood by those skilled in the art that the foregoing and other changes in the form and details may be made therein without departing from the invention.

What is claimed is:

1. A computer-readable method comprising:
   determining, at a first network node, whether a packet is to be sent from a first network to a second network, wherein
      the first network node is a perimeter network device of the first network, and
      the determining comprises
         determining whether
            the first network is configured to support a network security technique,
            the second network is not configured to support the network security technique, and
            the packet will be processed by a second network node, wherein
               the second network node is configured to support the network security technique;
   if the packet is to be sent from the first network to the second network , including network security information with the packet, wherein
      the network security information is associated with the network security technique,
      the network security information is configured to prevent the second network from accessing the network security information, and the network security information is configured to allow the second network node to access the network security information; and if the packet is not to be sent from the first network to the second network, performing further processing on the packet.

2. The method of claim 1, wherein
the including network security information with the packet further comprises:
moving the network security information from a first location in packet overhead to a second location in the packet overhead, wherein
the second location in the packet overhead does not affect forwarding of the packet from the second network to a third network.

3. The method of claim 2, wherein
the first, second, and third networks are layer-2 networks,
the first network and the second network are coupled by a first layer-3 router, and
the second network and the third network are coupled by a second layer-3 router.

4. The method of claim 3, wherein
the second location in the packet overhead does not affect an ability of the second layer-3 router to process the packet; and
the second layer-3 router is not configured to process the network security information.

5. The method of claim 4, wherein
a layer-2 header of the packet comprises the first location in the packet overhead, and
a layer-3 header of the packet comprises the second location in the packet overhead.

6. The method of claim 1, wherein
the network security information comprises a security group tag.

7. The method of claim 1,
wherein the second network node is within a third network.

8. The method of claim 7, wherein
the second network node is a perimeter network device of the third network.

9. The method of claim 8, further comprising:
determining whether identification information of the third network matches routing information of the packet.

10. The method of claim 9, further comprising:
detecting the packet being sent from the second network to the third network; and
processing the network security information.

11. The method of claim 10, wherein
the processing the network security information comprises at least one of:
processing the packet using role based access control,
moving the network security information to a layer-2 header of the packet, and
removing the network security information from the packet.

12. The method of claim 9, further comprising:
obtaining the identification information, wherein
the obtaining the identification information comprises a least one of:
configuring an egress node of the first network to recognize the identification information,
using a network protocol to distribute the identification information, and
storing the identification information at a management station.

13. The method of claim 12, wherein
the storing the identification information at the management station further comprises:
including the identification information in an identification information list.

14. The method of claim 9, wherein
the identification information is a destination prefix, and
the routing information of the packet is a portion of a destination address of the packet.

15. An apparatus comprising:
a processor;
hardware configured to determine, at a first network node, whether a packet is to be sent from a first network node to a second network node, wherein
the first network node is a perimeter network device of the first network, and
the hardware configured to determine is further configured to determine whether
the first network is configured to support a network security technique,
the second network is not configured to support the network security technique, and
the packet will be processed by a second network node, wherein
the second network node is configured to support the network security technique;
hardware configured to include network security information with the packet, if the packet is to be sent from the first network to the second network, wherein
the processor is coupled to control the hardware configured to include,
the hardware configured to include is coupled to the hardware configured to determine,
the network security information is associated with the network security technique,
the network security information is configured to prevent the second network from accessing the network security information,
the network security information is configured to allow the second network node to access the network security information; and
hardware configured to perform further processing on the packet further, if the packet is not to be sent from the first network to the second network.

16. The apparatus of claim 15, wherein
the hardware configured to include network security information with the packet further comprises:
hardware configured to move the network security information from a first location in packet overhead to a second location in the packet overhead, wherein
the second location in the packet overhead does not affect forwarding of the packet from the second network to a third network.

17. The apparatus of claim 16, wherein
the first, second, and third networks are layer-2 networks,
the first network node-and the second network node-are coupled by a first layer-3 router, and
the second network and the third network are coupled by a second layer-3 router.

18. The apparatus of claim 17, wherein
the second location in the packet overhead does not affect an ability of the second layer-3 router to process the packet, and
the second layer-3 router is not configured to process the network security information.

19. The apparatus of claim 18, wherein
a layer-2 header of the packet comprises the first location in the packet overhead, and a layer-3 header of the packet comprises the second location in the packet overhead.

20. The apparatus of claim 15, wherein
the network security information comprises a security group tag.

21. The apparatus of claim 15,
wherein the second network node is within a third network.

22. The apparatus of claim 21, wherein
the second network node is a perimeter network device of the third network.

23. The apparatus of claim 22, further comprising:
hardware configured to determine whether identification information of the third network matches routing information of the packet.

24. The apparatus of claim 23, further comprising:
hardware configured to detect the packet being sent from the second network to the third network; and
hardware configured to process the network security information.

25. The apparatus of claim 24, wherein
the hardware configured to process the network security information comprises at least one of
hardware configured to process the packet using role based access control,
hardware configured to move the network security information to a layer-2 header of the packet, and
hardware configured to remove the network security information from the packet.

26. The apparatus of claim 23, further comprising:
hardware configured to obtain the identification information, wherein
the hardware configured to obtain the identification information comprises a least one of:
hardware configured to configure an egress node of the first network node-to recognize the identification information,
hardware configured to use a network protocol to distribute the identification information, and
hardware configured to store the identification information at a management station.

27. The apparatus of claim 26, wherein
the hardware configured to store the identification information at the management station further comprises:
hardware configured to include the identification information in an identification information list.

28. The apparatus of claim 23, wherein
the identification information is a destination prefix, and
the routing information of the packet is a portion of a destination address of the packet.

29. A computer program product comprising:
a first set of instructions, executable on a first network device, configured to determine whether a packet is to be sent from a first network to a second network, wherein
the first network device is a perimeter network device of the first network, and
the first set of instructions is further configured to determine whether
the first network is configured to support a network security technique,
the second network is not configured to support the network security technique, and
the packet will be processed by a second network node, wherein
the second network node is configured to support the network security technique;
a second set of instructions, executable on the first network device, configured to include network security information with the packet, if the packet is to be sent from the first network to the second network, wherein
the network security information is associated with the network security technique,
the network security information is configured to prevent the second network from accessing the network security information, and
the network security information is configured to allow the second network node to access the network security information;
a third set of instructions, executable on the first network device, configured to perform further processing on the packet, if the packet is not to be sent from the first network to the second network; and
computer readable media, wherein the computer program product is encoded in the computer readable media.

30. The computer program product of claim 29, wherein the second set of instructions comprises:
a first subset of instructions, executable on the first network device, configured to
move the network security information from a first location in packet overhead to a second location in the packet overhead, wherein
the second location in the packet overhead does not affect forwarding of the packet from the second network to a third network.

31. The computer program product of claim 30, wherein
the first, second, and third networks are layer-2 networks,
the first network and the second network are coupled by a first layer-3 router, and
the second network and the third network are coupled by a second layer-3 router.

32. The computer program product of claim 31, wherein
the second location in the packet overhead does not affect an ability of the second layer-3 router to process the packet; and
the second layer-3 router is not configured to process the network security information.

33. The computer program product of claim 32, wherein
a layer-2 header of the packet comprises the first location in the packet overhead, and
a layer-3 header of the packet comprises the second location in the packet overhead.

34. The computer program product of claim 29, wherein
the network security information comprises a security group tag.

35. The computer program product of claim 29,
wherein the second network node is within a third network.

36. The computer program product of claim 35, wherein
the second network node is a perimeter network device of the third network.

37. The computer program product of claim 36, further comprising:
a fourth set of instructions, executable on the first network device, configured to determine whether identification information of the third network matches routing information of the packet.

38. The computer program product of claim 37, further comprising:
a fifth set of instructions, executable on the first network device, configured to detect the packet being sent from the second network to the third network, wherein the third network node employs the network security technique; and
a sixth set of instructions, executable on the first network device, configured to process the network security information.

39. The computer program product of claim 38, wherein the sixth set of instructions comprises at least one of:
- a second subset of instructions, executable on the first network device, configured to process the packet using role based access control,
- a third subset of instructions, executable on the first network device, configured to move the network security information to a layer-2 header of the packet, and
- a fourth subset of instructions, executable on the first network device, configured to remove the network security information from the packet.

40. The computer program product of claim 37, further comprising:
a fifth set of instructions, executable on the first network device, configured to obtain the identification information, wherein
the fifth set of instructions comprises a least one of:
- a second subset of instructions, executable on the first network device, configured to configure an egress node of the first network to recognize the identification information,
- a third subset of instructions, executable on the first network device, configured to use a network protocol to distribute the identification information, and
- a fourth subset of instructions, executable on the first network device, configured to store the identification information at a management station.

41. The computer program product of claim 40, wherein the fourth subset of instructions further comprises:
a fifth subset of instructions, executable on the first network device, configured to include the identification information in an identification information list.

42. The computer program product of claim 37, wherein the identification information is a destination prefix, and the routing information of the packet is a portion of a destination address of the packet.

43. An apparatus comprising:
a first network device, wherein the first network device is configured to determine whether a packet is to be sent from a first network device to a second network device, wherein
the first network device is configured to determine by virtue of being configured to determine whether
the first network device is configured to support a network security technique,
the second network device is not configured to support the network security technique, and
the packet will be processed by a third network device, wherein
the third network device is configured to support the network security technique;
include network security information in overhead of the packet, if the packet is to be sent from the first network device to the second network device, wherein
the network security information is associated with the network security technique,
the network security information is configured to prevent the second network device from accessing the network security information, and
the network security information is configured to allow the third network device to access the network security information; and
perform further processing on the packet, if the packet is not to be sent from the first network device to the second network device.

44. The apparatus of claim 43, wherein
the second network device is configured to support at least one of:
a first network protocol layer, and
a second network protocol layer.

45. The apparatus of claim 44, wherein
the first network device is configured to process the packet using role based access control.

46. The apparatus of claim 44, wherein
the first network device is configured to move the network security information to a new location in the overhead of the packet, wherein
the new location in the overhead of the packet does not affect forwarding of the packet by the second network device.

47. The apparatus of claim 46, wherein
the first network device is configured to move the network security information to a location in the overhead of the packet that is accessible to the third network device.

48. The apparatus of claim 46, wherein
the first network protocol layer is a layer-3 network protocol, and
the second network protocol layer is a layer-2 network protocol.

49. The apparatus of claim 48, wherein
the second network device is a layer-2 switch.

50. The apparatus of claim 49, wherein
the network security information comprises a security group tag.

51. A method of communicating packets between networks comprising:
communicating a packet from a first network to a second network, wherein
the first network is capable of processing network security information;
determining, at a first network device, whether to include network security information in the packet, wherein
the determining is performed by comparing identification information associated with the second network with information in the packet;
including the network security information, if the second network is capable of processing the network security information; and
preventing the network security information from being included in the packet if the second network is not capable of processing the network security information.

52. The method of claim 51, further comprising:
including the identification information in an identification information list; and
storing the identification information list at a network management station.

53. The method of claim 52, wherein
the network security information comprises a security group tag.

54. The method of claim 52, wherein
the identification information is a destination prefix.

55. The method of claim 52, wherein
the network security information is included in a location in the packet that is accessible by a second network device, and
the second network device is capable of processing the network security technique.

56. The method of claim 55, wherein
the including the network security information is performed by the first network device.

* * * * *